United States Patent Office 3,282,393
Patented Nov. 1, 1966

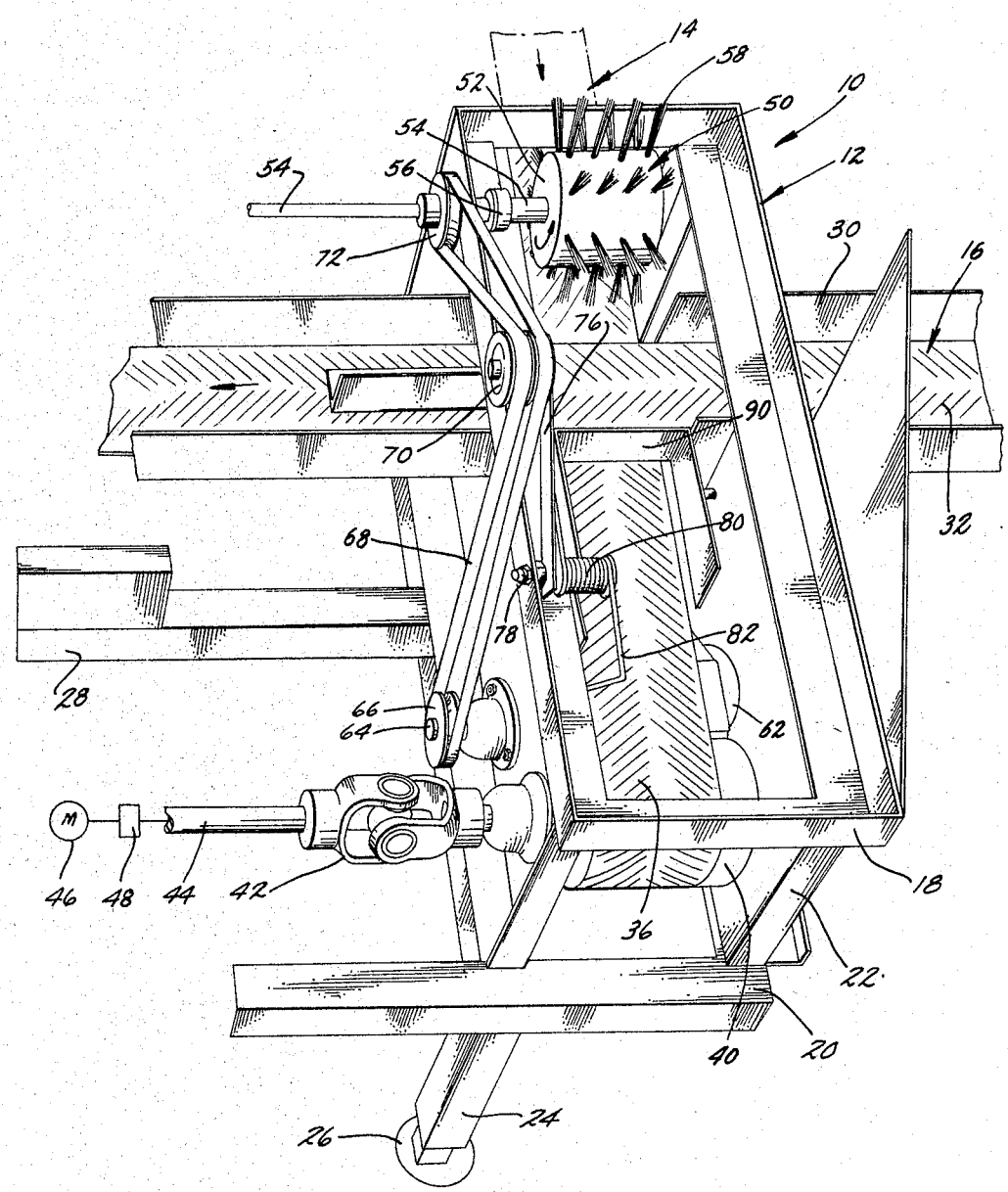

3,282,393
TRANSFER DEVICE FOR EGG CONVEYORS
Jewel Graves, Holland, and Willis R. Voran, Zeeland, Mich., assignors to Big Dutchman Inc., a corporation of Michigan
Filed Apr. 20, 1964, Ser. No. 361,151
1 Claim. (Cl. 198—25)

This invention relates to egg conveying equipment, and more particularly to egg transfer means on conveying equipment, especially for shifting eggs from one moving conveying belt to another belt transverse thereto.

Automation in the poultry house today includes conveyorized egg handling and removal. Economically run poultry houses are of very substantial size, including row upon row of nests or cages, depending upon the system employed. Conveying apparatus to collect the eggs from the many rows and transfer them to a common collection area necessarily involves changes of direction of the conveying equipment. The collection conveyors are commonly parallel to each other along the rows and meet a transverse conveyor common to them all. The egg "flow" therefore changes direction between the conveyors in the transfer from one conveyor to the second conveyor moving in a different direction. Although this concept is relatively simple, very real difficulties arise in practice. If the conveyor surface of the first conveyor is placed at the same height as that of the second, the eggs tend to remain in the slight clearance between the two transversely moving conveyor surfaces. This causes egg accumulation and breakage. Elevating the first conveyor surface to a level above the second surface is not usually successful since the first belt pulley must be mounted adjacent the second belt so that the first belt can terminate just short of the second belt and deposit the eggs on the second belt. However, since the belt must travel down around an arcuate portion of the pulley adjacent the second belt, it still lowers the eggs enough to catch in the clearance between the two belts. If the first belt moves over the top of the second belt, it will carry the egg right past the second belt. If it is mounted to move directly under the second belt, the egg will have to move up over the edge of the second belt. Instead it sits and rolls backward at this edge, causing eggs to accumulate.

It is therefore an object of this invention to provide a unique egg shifting device to transfer eggs from one conveying surface to a second conveying surface, and to do so reliably without egg breakage or accumulation.

It is another object of this invention to provide an egg transfer device for moving eggs from a first conveyor belt moving in one direction to a second conveyor belt moving in a different direction. Moreover, it can even dependably transfer eggs from one belt up over the edge of a second overlapping transverse belt.

These and several other objects of this invention will become apparent upon studying the following specification in conjunction with the drawings in which:

The figure is a perspective view of the egg transfer equipment from above, showing fragmentary portions of the transverse conveyors.

Referring now specifically to the drawing, the complete apparatus 10 includes a frame means 12 which forms the support for a juncture of a first conveyor 14 with a second conveyor 16 moving transversely thereto.

Each of the conveyor belts is horizontal in orientation, to carry eggs from nests (not shown) along conveyor 14 to be transferred to common conveyor 16. Normally, a plurality of these junctures will be found at one end of the poultry house, to accommodate a plurality of the parallel adjacent conveyors 14 from rows of bird cages or nests. Therefore, common conveyor 16 will be transverse to all of these adjacent like conveyors 14 to receive the eggs therefrom and transfer them to a common collection point.

The framework 12 is of suitable structural components such as the angle iron components welded together to form an upper platform 18, a lower platform 20, intermediate spacer elements therebetween 22, and a plurality of support legs 24 contacting the floor 26. Preferably, a minimum of legs is used, coupled with longitudinally extending braces 28 which interconnect framework 12 with the framework of the adjacent like juncture unit.

Each of the conveyors is of conventional type, including a flexible belt and an underlying support surface with side retention flanges. For example, conveyor 16 includes a generally U-shaped metallic support trough 30 within which endless, driven, flexible belt 32 rides. A similar support means is provided for conveyor 14 with its belt 36.

Since the two belts overlap each other at their juncture, and since the eggs must be transferred from belt 36 to belt 32, belt 32 passes over the surface of belt 36. If this were reversed, the eggs could conceivably be transferred but it would be more difficult since the egg would have to change direction by the shifting mechanism rather than by belt movement. Consequently, the overlap illustrated is preferred. Both of the belts are driven with motor operated pulleys. For example, belt 36 is continuously driven by revolving pulley 40 through a universal joint 42 and shaft 44 from a motor 46 and gear box 48, the latter two items being shown schematically. Similar drive mechanism is employed for belt 32. When both belts are driven in the directions indicated by the graphic arrows, the eggs move on belt 36 until they abut the edge of overlying belt 32. Since the belt thickness is substantial, normally being from an eighth to a quarter of an inch, eggs tend to stop at this edge and spin backwards as belt 36 passes beneath belt 32. The eggs, therefore, accumulate in this area, causing egg breakage and preventing proper transfer along the mechanism.

In order to achieve efficient, effective egg transfer from the lower to the upper belt, and yet to do so in a gentle manner not harmful to the eggs, the unique transfer mechanism 50 is employed. This mechanism includes a generally cylindrical revolvable element 52 having a central spin axis, and mounted on shaft 54. The shaft is suspended in bearings 56 supported by upper platform 18 of framework 12. Preferably, shaft 54 extends across to the next like transfer mechanism (not shown) to drive both from one driving motor.

Extending radially from the surface of revolving element 52, and having their inner ends embedded in this element, is a plurality of bunches of flexible, resilient bristles 58. The bunches are longitudinally spaced in rows. The rows are circumferentially spaced around the periphery of element 52. The bristles extend down to terminate at the belt surface, or at least at a spacing therefrom less than the egg diameter. This transfer unit is mounted on a horizontal rotational axis immediately above the juncture of the two belts. The bristles on the lower side move generally co-directionally with belt 36 when adjacent thereto.

The circumferential spacing of the bristle rows is greater than the egg size to allow eggs to be gently held between two adjacent rows of bristle bunches. Sufficient clearance is allowed to cause the bristles to move smoothly in behind the eggs to push them along, or literally, brush them along. The bunches are longitudinally spaced at a spacing smaller than the egg dimensions to prevent eggs from slipping through the bunches and escaping from in front of a row of bristles as the brush revolves in the direction indicated by the arrow. When the brush is driven rotatably, it sweeps in behind the eggs and brushes them up over the edge of belt 32, gently but effectively, to transfer them and cause them to move in a transverse direction along the second receiving belt. If the eggs present substantial resistance to movement, the bristles will then flex to pass over the egg instead of crushing it.

The brush is rotatably driven by a motor and belt connection. The motor 62 is mounted on lower platform 20 of the frame and operably drives a shaft 64 on which pulley 66 is mounted. The motor may be geared down through a suitable gear box mechanism (not shown). Pulley 66 drives flexible V-belt 68, which passes over an idler pulley 70 and a driven pulley 72 on shaft 54. Idler pulley 70 is mounted on a shiftable bracket 76 which is pivotally mounted at 78 to upper platform 18. A coil spring 80 around the pivot stud 78 and having a finger 82 engaged with the bottom side of platform 18 provides a constant tightening bias on idler pulley 70. The eggs are prevented from rolling across belt 32 and back onto belt 36 by a barrier or guard 90 extending across belt 36 on the edge of belt 32 opposite the juncture edge. The guard is attached to framework 12.

In operation, the eggs are collected by conveyor 14 and move along the surface of conveyor belt 36. At the juncture of belt 36 with overlapping belt 32 moving transversely thereto, the rows of bristle bunches on revolving element 52 sweep in behind the eggs to gently but assuredly push the eggs over the edge of belt 32 onto its surface, to move in a transverse direction.

Actual use has proven the unit to be extremely effective. It prevents accumulation of eggs at the juncture of the two belts, yet does not damage the eggs in any way in spite of its positive action. Eggs, therefore, are not left on the conveyor over night to be spoiled.

It is conceivable that certain details of this transfer mechanism could conceivably be modified to suit a particular type of surroundings or conveyor mechanism. Since it is practically impossible to show all of these detailed variations which might fall within the inventive concept set forth herein, and since these would only be obvious modifications hereof, it is intended that the invention should not be limited merely to the particular preferred illustrated form, but only by the scope of the appended claim and the reasonable equivalents thereto.

We claim:

An egg transfer device for conveyor belts moving in different directions, comprising: a pair of conveyor belts and support means therefor; said support means arranged to allow movement of the first belt adjacent to and over the second belt; transfer means at the juncture of said belts to shift eggs from the lower belt to the upper belt; said transfer means comprising an elongated generally cylindrical element rotatably mounted above said lower belt at the edge of the upper belt on an axis generally normal to the direction of movement of said lower belt; a plurality of flexible, resilient, elongated bristles mounted to and projecting radially from said element toward said belts to move adjacent said belts; and drive means operably connected with said rotatable element to rotate said element and bristles in the direction of movement of said lower belt, to gently push eggs up over the edge of said upper belt for movement on said upper belt.

References Cited by the Examiner

UNITED STATES PATENTS

| | | | |
|---|---|---|---|
| 1,922,717 | 8/1933 | Smitt | 198—25 |
| 2,534,954 | 12/1950 | Dalton | 198—25 X |

FOREIGN PATENTS 503,840 4/1939 Great Britain.

EVON C. BLUNK, *Primary Examiner.*

EDWARD A. SROKA, *Examiner.*